(12) United States Patent
Seo et al.

(10) Patent No.: US 12,043,736 B2
(45) Date of Patent: *Jul. 23, 2024

(54) POLYAMIDE RESIN COMPOSITION AND MOLDED PRODUCT COMPRISING SAME

(71) Applicant: LOTTE CHEMICAL CORPORATION, Seoul (KR)

(72) Inventors: Yeong Deuk Seo, Uiwang-si (KR); Sang Hwa Lee, Uiwang-si (KR); Sang Hyun Hong, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 854 days.

This patent is subject to a terminal disclaimer.

(21) Appl. No.: 17/059,288

(22) PCT Filed: May 21, 2019

(86) PCT No.: PCT/KR2019/006091
§ 371 (c)(1),
(2) Date: Nov. 27, 2020

(87) PCT Pub. No.: WO2019/231160
PCT Pub. Date: Dec. 5, 2019

(65) Prior Publication Data
US 2021/0214555 A1     Jul. 15, 2021

(30) Foreign Application Priority Data

May 31, 2018 (KR) .................. 10-2018-0062891

(51) Int. Cl.
*C08L 77/10* (2006.01)
*C08K 3/26* (2006.01)
(Continued)

(52) U.S. Cl.
CPC ........ *C08L 77/10* (2013.01); *C08K 2003/265* (2013.01); *C08L 2201/08* (2013.01);
(Continued)

(58) Field of Classification Search
CPC .......... C08L 77/10; C08L 23/08; C08L 23/26; C08L 51/00; C08L 77/06; C08L 77/00;
(Continued)

(56) References Cited

U.S. PATENT DOCUMENTS 3,484,403 A   12/1969  Brunson
3,877,965 A    4/1975  Broadbent et al.
(Continued)

FOREIGN PATENT DOCUMENTS

CN       101861358 A     10/2010
CN       101878252 A     11/2010
(Continued)

OTHER PUBLICATIONS

International Search Report in commonly owned International Application No. PCT/KR2016/009307, dated Nov. 16, 2016, pp. 1-6.
(Continued)

*Primary Examiner* — John D Freeman
(74) *Attorney, Agent, or Firm* — Additon, Pendleton & Witherspoon, P.A.

(57) ABSTRACT

The polyamide resin composition of the present invention comprises: about 15 to about 49 wt % of an aromatic polyamide resin containing a repeating unit represented by chemical formula 1 and a repeating unit represented by chemical formula 2; about 1 to about 30 wt % of a polyamide resin having a glass transition temperature of about 40 to about 120° C.; about 1 to about 20 wt % of an olefin-based copolymer; about 5 to about 40 wt % of calcium carbonate; and about 5 to about 40 wt % of talc. The polyamide resin composition and the molded product formed therefrom are (Continued)

excellent in plating adhesion, impact resistance, stiffness, heat resistance, flowability, appearance characteristics, and the like.

14 Claims, 1 Drawing Sheet

(51) Int. Cl.
  *C25D 5/56* (2006.01)
  *C23C 18/31* (2006.01)
  *C25D 3/04* (2006.01)

(52) U.S. Cl.
  CPC ....... *C08L 2203/20* (2013.01); *C08L 2205/02* (2013.01); *C08L 2205/03* (2013.01); *C08L 2666/62* (2013.01); *C08L 2666/72* (2013.01); *C23C 18/31* (2013.01); *C25D 3/04* (2013.01); *C25D 5/56* (2013.01)

(58) Field of Classification Search
  CPC ............... C08L 23/0815; C08L 51/003; C08L 2201/08; C08L 2203/20; C08L 2205/02; C08L 2205/03; C08L 2666/62; C08L 2666/72; C23C 18/31; C23C 18/22; C23C 18/1641; C25D 3/04; C25D 5/56; C08K 3/26; C08K 3/34; C08K 2003/265
  See application file for complete search history.

(56) References Cited

U.S. PATENT DOCUMENTS

| | | | |
|---|---|---|---|
| 4,552,626 | A | 11/1985 | Stevenson |
| 4,780,505 | A | 10/1988 | Mashita et al. |
| 5,256,719 | A | 10/1993 | Sham et al. |
| 5,292,805 | A | 3/1994 | Paschke et al. |
| 5,324,766 | A | 6/1994 | Ikejiri et al. |
| 6,117,561 | A | 9/2000 | Jacquement et al. |
| 6,617,381 | B1 | 9/2003 | Kumaki et al. |
| 9,845,389 | B2 | 12/2017 | Harder et al. |
| 9,932,444 | B2 | 4/2018 | Washio et al. |
| 10,450,460 | B2 | 10/2019 | Kim et al. |
| 2001/0003766 | A1 | 6/2001 | Nozaki |
| 2006/0100334 | A1 | 5/2006 | Ebert et al. |
| 2009/0127740 | A1 | 5/2009 | Kirchner |
| 2009/0142585 | A1 | 6/2009 | Kobayashi et al. |
| 2009/0143520 | A1 | 6/2009 | Elia et al. |
| 2010/0028602 | A1 | 2/2010 | Naritomi et al. |
| 2010/0160008 | A1 | 6/2010 | Topoulos |
| 2010/0237293 | A1 | 9/2010 | Kirchner |
| 2010/0324195 | A1 | 12/2010 | Williamson |
| 2012/0027983 | A1 | 2/2012 | Elia |
| 2012/0165445 | A1 | 6/2012 | Lee et al. |
| 2012/0196961 | A1 | 8/2012 | Kobayashi et al. |
| 2012/0196973 | A1 | 8/2012 | Doshi et al. |
| 2013/0165599 | A1 | 6/2013 | Je et al. |
| 2013/0209784 | A1 | 8/2013 | Nakagawa et al. |
| 2013/0237658 | A1 | 9/2013 | Eguchi et al. |
| 2014/0066561 | A1 | 3/2014 | Pfeghar et al. |
| 2014/0179851 | A1 | 6/2014 | Pfleghar et al. |
| 2014/0179866 | A1 | 6/2014 | Pfleghar et al. |
| 2015/0175804 | A1 | 6/2015 | Aepli |
| 2015/0274968 | A1 | 10/2015 | Bayer et al. |
| 2015/0329670 | A1 | 11/2015 | Washio et al. |
| 2016/0083509 | A1 | 3/2016 | Im et al. |
| 2016/0102202 | A1 | 4/2016 | Lamberts et al. |
| 2016/0130439 | A1 | 5/2016 | Koch et al. |
| 2016/0369097 | A1 | 12/2016 | Lee et al. |
| 2018/0244917 | A1 | 8/2018 | Kim et al. |
| 2018/0244919 | A1 | 8/2018 | Kim et al. |
| 2019/0077957 | A1 | 3/2019 | Yamada et al. |
| 2019/0127579 | A1 | 5/2019 | Kim et al. |
| 2019/0202186 | A1 | 5/2019 | Lee et al. |
| 2019/0203046 | A1 | 7/2019 | Lee et al. |

FOREIGN PATENT DOCUMENTS

| | | |
|---|---|---|
| CN | 102264839 A | 11/2011 |
| CN | 102532887 A | 7/2012 |
| CN | 103003046 A | 3/2013 |
| CN | 103044905 A | 4/2013 |
| CN | 103339201 A | 10/2013 |
| CN | 103881368 A | 6/2014 |
| CN | 2014-173057 A | 9/2014 |
| CN | 104725837 A | 6/2015 |
| CN | 104797631 A | 7/2015 |
| CN | 104854192 A | 8/2015 |
| CN | 105504800 A | 4/2016 |
| CN | 106046781 A | 10/2016 |
| CN | 107922732 A | 4/2018 |
| EP | 0368281 A1 | 5/1990 |
| EP | 0572266 A2 | 12/1993 |
| EP | 0690098 A2 | 1/1996 |
| EP | 2918624 A1 | 9/2015 |
| JP | 2003-112920 A | 4/2003 |
| JP | 2013-203851 A | 10/2013 |
| JP | 2015-071668 A | 4/2015 |
| JP | 2017-171879 A | 9/2017 |
| KR | 10-2010-0123178 A | 11/2010 |
| KR | 10-2013-0072513 A | 7/2013 |
| KR | 10-2013-0132437 A | 12/2013 |
| KR | 10-2014-0108517 A | 9/2014 |
| KR | 10-2016-0035954 A | 4/2016 |
| KR | 10-2017-0024201 A | 3/2017 |
| KR | 10-2017-0026833 A | 3/2017 |
| KR | 2017-099297 A | 8/2017 |
| WO | 2014/073219 A1 | 5/2014 |
| WO | 2017/034295 A1 | 3/2017 |
| WO | 2019/231160 A1 | 12/2019 |

OTHER PUBLICATIONS

Non-Final Office Action in commonly owned U.S. Appl. No. 15/754,328 mailed May 8, 2019, pp. 1-18.
Office Action in commonly owned Chinese Application No. 201811635926.2 dated Jan. 28, 2021, pp. 1-10.
Office Action in commonly owned Chinese Application No. 201811617729.8 dated Dec. 21, 2020, pp. 1-6.
Office Action in commonly owned Korean Application No. 10-2018-0139660 dated Sep. 7, 2020, pp. 1-5.
Office Action in commonly owned Korean Application No. 10-2017-0185031 dated Dec. 5, 2019, pp. 1-5.
Office Action in commonly owned U.S. Appl. No. 15/754,328 mailed Sep. 5, 2019, pp. 1-18.
Office Action in commonly owned Chinese Application No. 201680048870.3 dated Aug. 16, 2019, pp. 1-6.
Supplementary Search Report in commonly owned European Application No. 16839584.6 dated Apr. 16, 2019, pp. 1-7.
Final Office Action in commonly owned U.S. Appl. No. 16/233,156 dated Nov. 17, 2021, pp. 1-9.
Advisory Action in commonly owned U.S. Appl. No. 16/170,190 mailed Mar. 2, 2022, pp. 1-6.
Office Action in commonly owned U.S. Appl. No. 16/233,156 dated Oct. 29, 2020, pp. 1-10.
Office Action in commonly owned U.S. Appl. No. 16/233,156 dated May 19, 2021, pp. 1-6.
Advisory Action in commonly owned U.S. Appl. No. 16/233,156 dated Feb. 7, 2022, pp. 1-4.
Office Action in commonly owned U.S. Appl. No. 16/234,894 dated Nov. 4, 2020, pp. 1-9.
Office Action in commonly owned U.S. Appl. No. 16/234,894 dated Feb. 17, 2022, pp. 1-15.
Final Office Action in commonly owned U.S. Appl. No. 16/234,894 dated May 19, 2021, pp. 1-8.
Advisory Action in commonly owned U.S. Appl. No. 16/234,894 dated Sep. 8, 2021, pp. 1-3.
Non-Final Office Action in commonly owned U.S. Appl. No. 16/170,190 mailed Sep. 10, 2020, pp. 1-17.
Final Office Action in commonly owned U.S. Appl. No. 16/170,190 mailed Jan. 8, 2021, pp. 1-14.

(56) References Cited

OTHER PUBLICATIONS

Advisory Action in commonly owned U.S. Appl. No. 16/170,190 mailed Mar. 17, 2021, pp. 1-8.
Non-Final Office Action in commonly owned U.S. Appl. No. 16/170,190 mailed Jun. 29, 2021, pp. 1-18.
Final Office Action in commonly owned U.S. Appl. No. 16/170,190 mailed Oct. 12, 2021, pp. 1-16.
Bartczak et al., "Toughness mechanism in semi-crystalline polymer blends: II. High-density polyethylene toughened with calcium carbonate filler particles", Polymer 40 (1999) pp. 2347-2365.
Nylon 6T—Polymer Properties Database, Semi-aromatic polyamides (6T, DT, 6I), (Year: 2020), pp. 1-2.
Kim—KR 2017-0024201 A MT-KOR#1—2017, pp. 1-14.
Kim KR 2017-0026833 A—MT-KOR#2—aromatic+aliphatic polyamide+chelating agent—2017, pp. 1-16.
Office Action in commonly owned Chinese Application No. 201811247837.0 dated Nov. 17, 2020, pp. 1-8.
Xia Shengli et al., "Properties of PA66/EPDM-g-MAH/CaCO3 Composites" Department of Chemical and Biological Engineering, Nantong Vocational University, Nantong, China, vol. 45, No. 10, Oct. 2017, pp. 119-125.
Office Action in counterpart Chinese Application No. 201980045516.9 dated Oct. 19, 2022, pp. 1-6.
Office Action in commonly owned U.S. Appl. No. 16/170,190 dated Apr. 29, 2022, pp. 1-20.
Yamada—JP 2017-171879 A Biblio—aromatic PA+aliphatic PA + PE wax + calcium carb 1-50 um—Sep. 28, 2017 (Year: 2017) pp. 1.
Notice of Allowance in commonly owned U.S. Appl. No. 16/170,190 dated Jan. 17, 2023, pp. 1-20.
International Search Report in counterpart International Application No. PCT/KR2019/006091 dated Aug. 22, 2019, pp. 1-6.

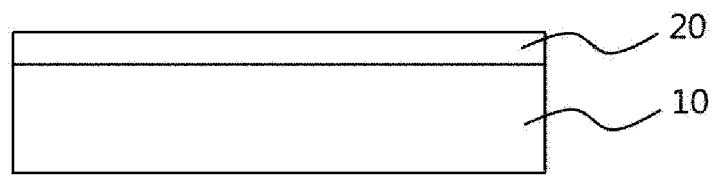

POLYAMIDE RESIN COMPOSITION AND MOLDED PRODUCT COMPRISING SAME

CROSS-REFERENCE TO RELATED APPLICATIONS

This application claims priority to and the benefit of International Application No. PCT/KR2019/006091, filed May 21, 2019, which published as WO 2019/231160 on Dec. 5, 2019, and Korean Patent Application No. 10-2018-0062891, filed in the Korean Intellectual Property Office on May 31, 2018, the entire disclosure of each of which is incorporated herein by reference.

TECHNICAL FIELD

The present invention relates to a polyamide resin composition and a molded product comprising the same. More particularly, the present invention relates to a polyamide resin composition which has good properties in terms of plating adhesion, impact resistance, stiffness, heat resistance, flowability, and appearance characteristics, and a molded product comprising the same.

BACKGROUND ART

Aromatic polyamide resins, such as polyphthalamide resins, are useful as materials for housings of electrical/electronic products, interior/exterior materials for automobiles, and exterior materials for buildings due to lower specific gravity than glass or metal and good properties in terms of heat resistance, abrasion resistance, chemical resistance, and the like. Particularly, with the recent trend toward lighter and more compact products, plastic products manufactured using such thermoplastic resins are rapidly replacing glass or metal products.

Further, in order to implement aesthetic features by providing a metallic appearance while maintaining such advantages of the polyamide resin, a technique of plating the polyamide resin has been developed. Plating of the polyamide resin is performed for the purpose of decoration and corrosion resistance, and crucial elements thereof are appearance after plating and adhesion (plating adhesion or plateability) between a plating layer and the resin.

To this end, there has been developed a method of adding an inorganic material or an epoxy group-containing polyolefin to a polyamide resin composition in order to improve plateability. However, this method has a drawback of deterioration in mechanical properties of the resin composition, such as impact resistance and stiffness, and thus has a limited application range. In addition, there has been proposed a method of alloying a polyamide resin with an acrylonitrile-butadiene-styrene (ABS) resin or a polycarbonate resin in order to improve plateability of the resin composition. However, this method has a problem of deterioration in heat resistance of the resin composition.

Therefore, there is a need for a polyamide resin composition which has good plating adhesion (plateability), impact resistance, stiffness, heat resistance, flowability, and appearance characteristics.

The background technique of the present invention is disclosed in Korean Patent Laid-open Publication No. 10-2010-0123178 and the like.

DISCLOSURE

Technical Problem

It is one aspect of the present invention to provide a polyamide resin composition which has good properties in terms of plating adhesion, impact resistance, stiffness, heat resistance, flowability, and appearance characteristics.

It is another aspect of the present invention to provide a molded product formed of the polyamide resin composition set forth above.

The above and other aspects of the present invention will become apparent from the detailed description of the following embodiments.

Technical Solution

1. One aspect of the present invention relates to a polyamide resin composition. The polyamide resin composition comprises: about 15 wt % to about 49 wt % of an aromatic polyamide resin comprising a repeat unit represented by Formula 1 and a repeat unit represented by Formula 2; about 1 wt % to about 30 wt % of a polyamide resin having a glass transition temperature of about 40° C. to about 120° C.; about 1 wt % to about 20 wt % of an olefin copolymer; about 5 wt % to about 40 wt % of calcium carbonate; and about 5 wt % to about 40 wt % of talc,

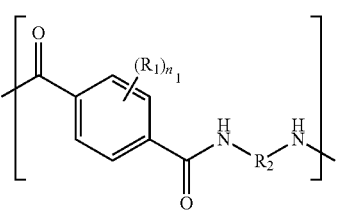

[Formula 1]

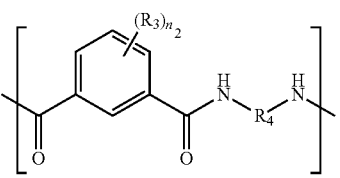

[Formula 2]

where $R_1$ and $R_3$ are each independently a $C_1$ to $C_6$ hydrocarbon group or a halogen atom, $R_2$ and $R_4$ are each independently a $C_6$ to $C_{12}$ linear or branched alkylene group, and $n_1$ and $n_2$ are each independently an integer of 0 to 4.

2. In Embodiment 1, the aromatic polyamide resin may comprise about 60 mol % to about 80 mol % of the repeat unit represented by Formula 1 and about 20 mol % to about 40 mol % of the repeat unit represented by Formula 2.

3. In Embodiments 1 or 2, the aromatic polyamide resin may have a glass transition temperature of about 130° C. to about 150° C.

4. In Embodiments 1 to 3, the polyamide resin having a glass transition temperature of about 40° C. to about 120° C. may comprise at least one of an aliphatic polyamide resin, an amorphous polyamide resin, and a semi-aromatic polyamide resin comprising an aliphatic dicarboxylic acid unit.

5. In Embodiments 1 to 4, the aliphatic polyamide resin may comprise at least one of polyamide 6, polyamide 11, polyamide 12, polyamide 46, polyamide 66, and polyamide 610.

6. In Embodiments 1 to 5, the aromatic polyamide resin and the polyamide resin having a glass transition temperature of about 40° C. to about 120° C. may be present in a weight ratio of about 4:1 to about 10:1.

7. In Embodiments 1 or 6, the olefin copolymer may comprise an ethylene-α-olefin copolymer or a modified ethylene-α-olefin copolymer obtained through graft copolymerization of at least one compound of α,β-unsaturated dicarboxylic acids and α,β-unsaturated dicarboxylic acid derivatives to the ethylene-α-olefin copolymer.

8. In Embodiments 1 or 7, the at least one compound of α,β-unsaturated dicarboxylic acids and α,β-unsaturated dicarboxylic acid derivatives may comprise at least one of maleic acid, maleic anhydride, maleic hydrazide, dichloro maleic anhydride, unsaturated dicarboxylic acid, fumaric acid, citric acid, and citric anhydride.

9. In Embodiments 1 to 8, the olefin copolymer may comprise a maleic anhydride-modified ethylene-octene copolymer.

10. In Embodiments 1 to 9, the calcium carbonate and the talc may be present in a weight ratio of about 1:0.5 to about 1:4.

11. In Embodiments 1 to 10, the polyamide resin composition may have a plating adhesion strength of about 5 N/cm to about 25 N/cm, as measured on an injection-molded specimen having a size of 10 cm×10 cm×3.2 cm and plated with a 30 μm thick chromium layer at a peeling rate of 50 mm/min using a tensile tester in accordance with JIS C6481.

12. In Embodiments 1 to 11, the polyamide resin composition may have a notched Izod impact strength of about 4 kgf·cm/cm to about 12 kgf·cm/cm, as measured on a ⅛" thick notched Izod specimen in accordance with ASTM D256.

13. In Embodiments 1 to 12, the polyamide resin composition may have a flexural strength of about 800 kgf/cm² to about 1,500 kgf/cm² and a flexural modulus of about 40,000 kgf/cm² to about 70,000 kgf/cm², as measured on a specimen having a size of 127 mm×12.7 mm×6.4 mm at 2.8 mm/min in accordance with ASTM D790.

14. In Embodiments 1 to 13, the polyamide resin composition may have a heat deflection temperature (HDT) of about 120° C. to about 160° C., as measured at a heating rate of 120° C./hr under a load of 18.56 kgf/cm² in accordance with ASTM D648.

15. Another aspect of the present invention relates to a molded product. The molded product comprises: a base layer; and a plating layer formed on at least one surface of the base layer, wherein the base layer is formed of the polyamide resin composition according to any one of Embodiments 1 to 14.

Advantageous Effects

The present invention provides a polyamide resin composition which has good properties in terms of plating adhesion, impact resistance, stiffness, heat resistance, flowability, and appearance characteristics, and a molded product formed of the same.

DESCRIPTION OF DRAWINGS

FIG. 1 is a schematic cross-sectional view of a molded product according to one embodiment of the present invention.

BEST MODE

Hereinafter, exemplary embodiments of the present invention will be described in detail.

A polyamide resin composition according to the present invention comprises: (A) an aromatic polyamide resin; (B) a polyamide resin having a glass transition temperature of about 40° C. to about 120° C.; (C) an olefin copolymer; (D) calcium carbonate; and (E) talc.

As used herein to represent a specific numerical range, the expression "a to b" means "≥a and ≤b".

(A) Aromatic Polyamide Resin

The aromatic polyamide resin according to the present invention serves to improve plating adhesion and heat resistance of the polyamide resin composition (or a molded product formed thereof), and comprises a repeat unit represented by Formula 1 and a repeat unit represented by Formula 2.

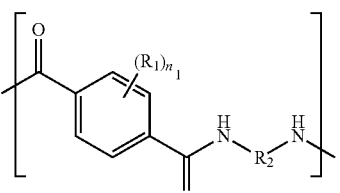

[Formula 1]

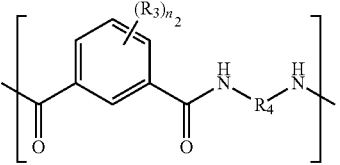

[Formula 2]

where $R_1$ and $R_3$ are each independently a $C_1$ to $C_6$ hydrocarbon group or a halogen atom, $R_2$ and $R_4$ are each independently a $C_6$ to $C_{12}$ linear or branched alkylene group, and $n_1$ and $n_2$ are each independently an integer of 0 to 4.

In some embodiments, the aromatic polyamide resin may comprise about 60 mol % to about 80 mol %, for example, about 65 mol % to about 75 mol %, of the repeat unit represented by Formula 1 and about 20 mol % to about 40 mol %, for example, about 25 mol % to about 35 mol %, of the repeat unit represented by Formula 2. Within this range, the polyamide resin composition can have good properties in terms of plating adhesion, heat resistance, and the like. Here, the aromatic polyamide resin may be prepared by reacting a dicarboxylic acid component, which comprises about 60 mol % to about 80 mol %, for example, about 65 mol % to about 75 mol %, of terephthalic acid having a phenyl group substituted or unsubstituted with $R_1$ or an alkyl ester thereof and about 20 mol % to about 40 mol %, for example, about 25 mol % to about 35 mol %, of isophthalic acid having a phenyl group substituted or unsubstituted with $R_3$ or an alkyl ester thereof, with an aliphatic diamine component having a $C_6$ to $C_{12}$ linear or branched alkylene group (1,6-hexanediamine (hexamethylene diamine (HMDA)), 1,7-heptanediamine, 1,8-octanediamine, 1,9-nonanediamine, 1,10-decanediamine, 1,11-undecanediamine, 1,12-dodecanediamine, and the like) by any suitable polymerization method known in the art.

In some embodiments, the aromatic polyamide resin may have a glass transition temperature of about 130° C. to about 150° C., for example, about 130° C. to about 140° C., as measured by differential scanning calorimetry (DSC). Within this range, the polyamide resin composition can have good properties in terms of heat resistance, stiffness, and the like.

In addition, the aromatic polyamide resin may have an intrinsic viscosity [η] of about 0.7 dL/g to about 1.0 dL/g, for example, about 0.8 dL/g to about 0.9 dL/g, as measured using an Ubbelohde viscometer at 25° C. after dissolving the polyamide resin in a strong (98%) sulfuric acid solution to a concentration of 0.5 g/dL. Within this range, the polyamide resin composition can have good properties in terms of processability and appearance characteristics.

In some embodiments, the aromatic polyamide resin may be present in an amount of about 15 wt % to about 49 wt %, for example, about 30 wt % to about 48 wt %, based on the total weight of the polyamide resin composition. If the content of the aromatic polyamide resin is less than about 15 wt %, the polyamide resin composition can have poor properties in terms of plating adhesion, heat resistance, processability, stiffness, and the like, whereas, if the content of the polyamide resin exceeds about 49 wt %, the polyamide resin composition can have poor properties in terms of plating adhesion, impact resistance, flowability, processability, and the like.

(B) Polyamide resin having a glass transition temperature of about 40° C. to about 120° C.

According to the present invention, the polyamide resin having a glass transition temperature of about 40° C. to about 120° C. serves to improve appearance characteristics, flowability, and plating adhesion of the polyamide resin composition together with the aromatic polyamide resin, and may be selected from typical polyamide resins having a glass transition temperature of about 40° C. to about 120° C., as measured by differential scanning calorimetry (DSC).

In some embodiments, the polyamide resin having a glass transition temperature of about 40° C. to about 120° C. may comprise an aliphatic polyamide resin, an amorphous polyamide resin, a semi-aromatic polyamide resin comprising an aliphatic dicarboxylic acid unit, and combinations thereof.

In some embodiments, the aliphatic polyamide resin may comprise polyamide 6, polyamide 11, polyamide 12, polyamide 46, polyamide 66, polyamide 610, polyamide 612, polyamide 1012, and combinations thereof.

In some embodiments, the polyamide resin having a glass transition temperature of about 40° C. to about 120° C. may have an intrinsic viscosity [η] of about 0.5 dL/g to about 2.0 dL/g, for example, about 0.7 dL/g to about 1.5 dL/g, as measured using an Ubbelohde viscometer at 25° C. after dissolving the polyamide resin in a strong (98%) sulfuric acid solution to a concentration of 0.5 g/dL. Within this range, the polyamide resin composition can have good properties in terms of processability, appearance characteristics, plating adhesion, and the like.

In some embodiments, the polyamide resin having a glass transition temperature of about 40° C. to about 120° C. may be present in an amount of about 1 wt % to about 30 wt %, for example, about 3 wt % to about 20 wt %, specifically about 5 wt % to about 10 wt %, based on the total weight of the polyamide resin composition. If the content of the polyamide resin is less than about 1 wt %, the polyamide resin composition can have poor properties in terms of plating adhesion, flowability, appearance characteristics, and the like, whereas, if the content of the polyamide resin exceeds about 30 wt %, the polyamide resin composition can have poor properties in terms of plating adhesion, heat resistance, processability, compatibility (inorganic substance dispersion), and the like.

In some embodiments, the aromatic polyamide resin (A) and the polyamide resin (B) may be present in a weight ratio (A:B) of about 4:1 to about 10:1. Within this range, the polyamide resin composition can have better properties in terms of plating adhesion, appearance characteristics, processability, and the like.

(C) Olefin Copolymer

The olefin copolymer according to the present invention is used together with the aromatic polyamide resin and the polyamide resin having a glass transition temperature of about 40° C. to about 120° C. to improve plating adhesion (plateability) between a plating layer and a molded product manufactured using the polyamide resin composition upon plating of the molded product and to improve impact resistance and other properties of the polyamide resin composition, and may be a copolymer of at least two olefin monomers or a copolymer of an olefin monomer and an acrylic monomer.

In some embodiments, the olefin monomer may be a $C_1$ to $C_{19}$ alkylene and may comprise, for example, ethylene, propylene, butylene, isobutylene, octene, and combinations thereof; and the acrylic monomer may be an alkyl (meth) acrylic ester or a (meth)acrylic ester. Here, the alkyl refers to a $C_1$ to $C_{10}$ alkyl group and the alkyl (meth)acrylic ester may comprise methyl (meth)acrylate, ethyl (meth)acrylate, propyl (meth)acrylate, butyl (meth)acrylate, and the like.

In some embodiments, the olefin copolymer may comprise an ethylene-α-olefin copolymer or a modified ethylene-α-olefin copolymer obtained through graft copolymerization of at least one compound of α,β-unsaturated dicarboxylic acids and α,β-unsaturated dicarboxylic acid derivatives to the ethylene-α-olefin copolymer.

In some embodiments, the at least one compound of α,β-unsaturated dicarboxylic acids and α,β-unsaturated dicarboxylic acid derivatives may comprise at least one of maleic acid, maleic anhydride, maleic hydrazide, dichloro maleic anhydride, unsaturated dicarboxylic acid, fumaric acid, citric acid, and citric anhydride. Preferably, the at least one compound of α,β-unsaturated dicarboxylic acids and α,β-unsaturated dicarboxylic acid derivatives is maleic acid or maleic anhydride.

In some embodiments, the olefin copolymer may be a maleic anhydride modified ethylene-octene copolymer. The maleic anhydride modified ethylene-octene copolymer exhibits good compatibility with the polyamide resin and can secure significant improvement in plating adhesion.

In some embodiments, the olefin copolymer may be present in an amount of about 1 wt % to about 20 wt %, for example, about 5 wt % to about 15 wt %, based on the total weight of the polyamide resin composition. If the content of the olefin copolymer is less than about 1 wt %, the polyamide resin composition can have poor properties in terms of plating adhesion, impact resistance, and the like, whereas, if the content of the olefin copolymer exceeds about 20 wt %, the polyamide resin composition can suffer from deterioration in heat resistance, stiffness, and the like.

(D) Calcium Carbonate

The calcium carbonate according to the present invention serves to allow effective anchoring of a catalyst upon plating, thereby significantly improving plating adhesion of the polyamide resin composition, and to improve appearance characteristics of the polyamide resin composition, and may comprise spherical or particulate calcium carbonate.

In some embodiments, the calcium carbonate may have an average particle diameter (D50, particle diameter corresponding to 50 wt % in a weight cumulative distribution of calcium carbonate particles) of about 0.05 μm to about 6 μm, for example, about 1 μm to about 4 μm, as measured using a particle size analyzer. Within this range, the polyamide resin composition can exhibit good properties in terms of plating adhesion, appearance characteristics, and the like.

In some embodiments, the calcium carbonate may be present in an amount of about 5 wt % to about 40 wt %, for example, about 5 wt % to about 30 wt %, based on the total weight of the polyamide resin composition. If the content of the calcium carbonate is less than about 5 wt %, the polyamide resin composition can suffer from deterioration in plating adhesion, mechanical properties (stiffness), and the like, whereas, if the content of the calcium carbonate exceeds about 40 wt %, the polyamide resin composition can suffer from deterioration in impact resistance and the like.

(E) Talc

The talc according to the present invention serves to improve plating adhesion, stiffness, heat resistance, and appearance characteristics of the polyamide resin composition together with calcium carbonate, and may be typical flake type talc.

In some embodiments, the talc may have an average particle diameter (D50, particle diameter corresponding to 50 wt % in a weight cumulative distribution of calcium carbonate particles) of about 2 μm to about 7 μm, for example, about 3 μm to about 5 μm, as measured using a particle size analyzer. Within this range, the polyamide resin composition can exhibit good properties in terms of plating adhesion, stiffness, heat resistance, appearance characteristics, and the like.

In some embodiments, the talc may be present in an amount of about 5 wt % to about 40 wt %, for example, about 15 wt % to about 35 wt %, based on the total weight of the polyamide resin composition. If the content of the talc is less than about 5 wt %, the polyamide resin composition can suffer from deterioration in impact resistance, mechanical properties (stiffness), heat resistance, and the like, whereas, if the content of the talc exceeds about 40 wt %, the polyamide resin composition can suffer from deterioration in plating adhesion, stiffness, appearance characteristics, and the like.

In some embodiments, the calcium carbonate (D) and the talc (E) may be present in a weight ratio (D:E) of about 1:0.5 to about 1:4, for example, about 1:1 to about 1:3. Within this range, the polyamide resin composition can have better properties in terms of plating adhesion, stiffness, heat resistance, appearance characteristics, and balance therebetween.

The polyamide resin composition according to one embodiment of the present invention may further comprise additives used in typical thermoplastic resin compositions. Examples of the additives may comprise a flame retardant, a lubricant, a plasticizer, a heat stabilizer, an antioxidant, a photostabilizer, a colorant, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the polyamide resin composition.

The polyamide resin composition according to one embodiment of the present invention may be prepared in pellet form by mixing the aforementioned components, followed by melt extrusion using a typical twin-screw extruder at about 200° C. to about 350° C., for example, about 250° C. to about 300° C.

In some embodiments, the polyamide resin composition may have a plating adhesion strength of about 5 N/cm to about 25 N/cm, for example, about 5 N/cm to about 15 N/cm, as measured on an injection-molded specimen having a size of 10 cm×10 cm×3.2 cm and plated with a 30 μm thick chromium layer at a peeling rate of 50 mm/min using a tensile tester in accordance with JIS C6481.

In some embodiments, the polyamide resin composition may have a notched Izod impact strength of about 4 kgf·cm/cm to about 12 kgf·cm/cm, for example, about 4 kgf·cm/cm to about 10 kgf·cm/cm, as measured on a ⅛" thick notched Izod specimen in accordance with ASTM D256.

In some embodiments, the polyamide resin composition may have a flexural strength of about 800 $kgf/cm^2$ to about 1,500 $kgf/cm^2$, for example, about 800 $kgf/cm^2$ to about 1,200 $kgf/cm^2$, and a flexural modulus of about 40,000 $kgf/cm^2$ to about 70,000 $kgf/cm^2$, for example, about 51,000 $kgf/cm^2$ to about 64,000 $kgf/cm^2$, as measured on a specimen having a size of 127 mm×12.7 mm×6.4 mm at 2.8 mm/min in accordance with ASTM D790.

In some embodiments, the polyamide resin composition may have a heat deflection temperature (HDT) of about 120° C. to about 160° C., for example, about 130° C. to about 150° C., as measured at a heating rate of 120° C./hr under a load of 18.56 $kgf/cm^2$ in accordance with ASTM D648.

FIG. 1 is a schematic cross-sectional view of a molded product according to one embodiment of the present invention. It should be noted that the drawing is exaggerated in thickness of lines and/or size of components for descriptive convenience and clarity only. In addition, it should be understood that the present invention is not limited to the drawings and may be realized in various shapes. Referring to FIG. 1, the molded product according to this embodiment comprises: a base layer 10; and a plating layer 20 formed on at least one surface of the base layer 10, wherein the base layer 10 is formed of the polyamide resin composition according to the present invention.

In some embodiments, the base layer 10 may be formed in various shapes from the polyamide resin composition by various molding methods, such as injection molding, extrusion, vacuum molding, or casting. Such molding methods are well known to those skilled in the art.

In some embodiments, the plating layer 20 may be formed by any suitable method of manufacturing plated plastic products known in the art. For example, the plating layer 20 may be formed by etching the base layer 10 and forming an anchor in an etched region, followed by plating, for example, electroless plating and electroplating, without being limited thereto.

In other embodiments, plating may be performed by typical wet plating or dry plating, such as chemical vapor deposition (CVD), physical vapor deposition (PVD), plasma CVD, or thermal spray coating, in addition to electroless plating and electroplating.

In addition, a plating process according to the present invention may be a typical plating process applicable to a base layer formed of ABS, PC/ABS, and the like. Typically, since a base layer formed of a polyamide resin composition is likely to have a high defect rate upon etching with a typical etching solution, plating of the base layer requires a dedicated etching solution and a dedicated plating line, causing increase in manufacturing costs. However, the base layer formed of the thermoplastic resin composition according to the present invention allows plating using an existing plating line and an existing etching solution without causing such problems.

In some embodiments, the plating layer 20 may comprise at least one of chromium, nickel, and copper, and may have a thickness of about 0.1 μm to about 100 μm, without being limited thereto.

The molded product can exhibit good plating adhesion between the base layer and the plating layer, and can secure good properties of the base layer in terms of appearance characteristics, impact resistance, and heat resistance. Thus, the molded product can be advantageously used as metallic appearance interior/exterior materials for automobiles, electronic/electric products, and office automation equipment.

MODE FOR INVENTION

Next, the present invention will be described in more detail with reference to some examples. It should be understood that these examples are provided for illustration only and are not to be construed in any way as limiting the present invention.

EXAMPLE

Details of components used in Examples and Comparative Examples are as follows.

(A) Polyamide 6T/6I (manufacturer: Solvay, product name: A8002, 6T:6I (mole ratio)=70:30, glass transition temperature: 130° C., intrinsic viscosity [η]: 0.88 dL/g) was used.

(B1) A polyamide resin having a glass transition temperature of 50° C. (Polyamide 66, manufacturer: Solvay, product name: 23 AE 1K, intrinsic viscosity [η]: 1.03 dL/g) was used.

(B2) A polyamide resin having a glass transition temperature of 120° C. (amorphous polyamide resin, manufacturer: Arkema, product name: G120, intrinsic viscosity [η]: 0.85 dL/g) was used.

(C) Olefin Copolymer

A maleic anhydride-modified ethylene-octene copolymer (manufacturer: DuPont, product name: N493D) was used.

(D) Calcium carbonate ($CaCO_3$, manufacturer: Omya AG, product name: 2HB, average particle diameter (D50): about 4 μm) was used.

(E) Talc

Flake type talc (manufacturer: Koch, product name: KCM 6300C, average particle diameter (D50): 6.51 μm) was used.

Examples 1 to 6 and Comparative Examples 1 to 4

The aforementioned components were mixed in amounts as listed in Tables 1 and 2, followed by extrusion at 300° C., thereby preparing a polyamide resin composition in pellet form. Here, extrusion was performed using a twin-screw extruder (L/D: 36, Φ: 45 mm). The prepared pellets were dried at a temperature of 80° C. to 100° C. for 4 hours or more and then subjected to injection molding using a 6 oz injection molding machine (cylinder temperature: 320° C., mold temperature: 130° C.), thereby preparing a specimen. The prepared specimen was evaluated as to the following properties. Results are shown in Tables 1 and 2.

Property Evaluation (1) Plating adhesion strength (unit: N/cm): Adhesion strength between a base layer and a plating layer was measured on an injection molded specimen having a size of 10 cm×10 cm×3.2 cm and plated with a 30 μm thick chromium layer at a peeling rate of 50 mm/min at a peeling angle of 90° with respect to the surface of the plating layer using a tensile tester in accordance with JIS C6481, in which the chromium layer had a cut-out at the center thereof to be secured to a fixture of the tensile tester.

(2) Notched Izod impact strength (unit: kgf·cm/cm): Notched Izod impact strength was measured on a ⅛" thick notched Izod specimen in accordance with ASTM D256.

(3) Flexural strength and flexural modulus (unit: kgf/$cm^2$): Flexural strength and flexural modulus were measured on a specimen having a size of 127 mm×12.7 mm×6.4 mm at 2.8 mm/min in accordance with ASTM D790.

(4) Heat deflection temperature (HDT, unit: ° C.): Heat deflection temperature was measured at a heating rate of 120° C./hr under a load of 18.56 kgf/$cm^2$ in accordance with ASTM D648.

TABLE 1

| | Example | | | | | |
|---|---|---|---|---|---|---|
| | 1 | 2 | 3 | 4 | 5 | 6 |
| (A) (wt %) | 45 | 45 | 45 | 45 | 40 | 40 |
| (B1) (wt %) | 5 | 5 | 5 | — | 10 | — |
| (B2) (wt %) | — | — | — | 5 | — | 10 |
| (C) (wt %) | 10 | 10 | 10 | 10 | 10 | 10 |
| (D) (wt %) | 10 | 15 | 20 | 15 | 15 | 15 |
| (E) (wt %) | 30 | 25 | 20 | 25 | 25 | 25 |
| Plating adhesion strength | 6.9 | 8.5 | 10.7 | 8.7 | 8.5 | 8.3 |
| Notched Izod impact strength | 4.3 | 4.2 | 4.4 | 4.3 | 4.1 | 4.2 |
| Flexural strength | 1,200 | 1,180 | 1,150 | 980 | 850 | 950 |
| Flexural modulus | 63,200 | 57,500 | 51,500 | 53,600 | 52,100 | 53,500 |
| Heat deflection temperature | 145 | 141 | 137 | 142 | 131 | 140 |

TABLE 2

| | Comparative Example | | | |
|---|---|---|---|---|
| | 1 | 2 | 3 | 4 |
| (A) (wt %) | 50 | 5 | 45 | 45 |
| (B1) (wt %) | 2 | 47 | 5 | 5 |
| (B2) (wt %) | — | — | — | — |
| (C) (wt %) | 8 | 8 | 10 | 10 |
| (D) (wt %) | 15 | 15 | 4 | 36 |
| (E) (wt %) | 25 | 25 | 36 | 4 |
| Plating adhesion strength | 3.6 | 0 (unplatable) | 1.2 | 18.5 |
| Notched Izod impact strength | 2.7 | 4.3 | 4.4 | 3.5 |
| Flexural strength | 1,100 | 1,150 | 1,130 | 830 |
| Flexural modulus | 58,000 | 56,500 | 65,100 | 35,500 |
| Heat deflection temperature | 142 | 121 | 148 | 115 |

From the results shown in Table 1, it could be seen that the polyamide resin composition according to the present invention had good properties in terms of plating adhesion, impact resistance, stiffness, heat resistance, and the like.

Conversely, it could be seen that the polyamide resin composition of Comparative Example 1 prepared using an excess of the aromatic polyamide resin suffered from deterioration in plating adhesion and impact resistance; and the polyamide resin composition of Comparative Example 2 prepared using a smaller amount of the aromatic polyamide resin and an excess of the polyamide resin having a glass transition temperature of 40° C. to 120° C. did not allow plating and suffered from deterioration in heat resistance, as compared with the polyamide resin composition of Examples. It could be seen that the polyamide resin composition of Comparative Example 3 prepared using a smaller amount of calcium carbonate suffered from deterioration in plating adhesion and the polyamide resin composition of Comparative Example 4 prepared using a smaller amount of talc suffered from deterioration in impact resistance, flexural modulus, impact resistance, and the like.

It should be understood that various modifications, changes, alterations, and equivalent embodiments can be made by those skilled in the art without departing from the spirit and scope of the invention.

The invention claimed is:
1. A polyamide resin composition comprising:
about 15 wt % to about 49 wt % of an aromatic polyamide resin comprising a repeat unit represented by Formula 1 and a repeat unit represented by Formula 2;

about 1 wt % to about 30 wt % of a polyamide resin having a glass transition temperature of about 40° C. to about 120° C.;
about 1 wt % to about 20 wt % of an olefin copolymer;
about 5 wt % to about 40 wt % of calcium carbonate; and
about 5 wt % to about 40 wt % of talc,
wherein the aromatic polyamide resin and the polyamide resin having a glass transition temperature of about 40° C. to about 120° C. are present in a weight ratio of about 4:1 to about 10:1, and
wherein the calcium carbonate and the talc are present in a weight ratio of about 1:0.5 to about 1:4,

[Formula 1]

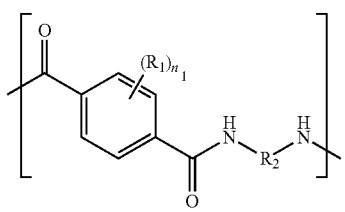

[Formula 2]

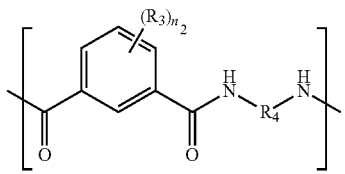

where $R_1$ and $R_3$ are each independently a $C_1$ to $C_6$ hydrocarbon group or a halogen atom, $R_2$ and $R_4$ are each independently a $C_6$ to $C_{12}$ linear or branched alkylene group, and $n_1$ and $n_2$ are each independently an integer of 0 to 4.

2. The polyamide resin composition according to claim 1, wherein the aromatic polyamide resin comprises about 60 mol % to about 80 mol % of the repeat unit represented by Formula 1 and about 20 mol % to about 40 mol % of the repeat unit represented by Formula 2.

3. The polyamide resin composition according to claim 1, wherein the aromatic polyamide resin has a glass transition temperature of about 130° C. to about 150° C.

4. The polyamide resin composition according to claim 1, wherein the polyamide resin having a glass transition temperature of about 40° C. to about 120° C. comprises an aliphatic polyamide resin, an amorphous polyamide resin, and/or a semi-aromatic polyamide resin comprising an aliphatic dicarboxylic acid unit.

5. The polyamide resin composition according to claim 4, wherein the aliphatic polyamide resin comprises polyamide 6, polyamide 11, polyamide 12, polyamide 46, polyamide 66, and/or polyamide 610.

6. The polyamide resin composition according to claim 1, wherein the olefin copolymer comprises an ethylene-α-olefin copolymer or a modified ethylene-α-olefin copolymer obtained through graft copolymerization of an α,β-unsaturated dicarboxylic acid and/or α,β-unsaturated dicarboxylic acid derivative to the ethylene-α-olefin copolymer.

7. The polyamide resin composition according to claim 6, wherein the α,β-unsaturated dicarboxylic acid and/or α,β-unsaturated dicarboxylic acid derivative comprises maleic acid, maleic anhydride, maleic hydrazide, dichloro maleic anhydride, unsaturated dicarboxylic acid, fumaric acid, citric acid, and/or citric anhydride.

8. The polyamide resin composition according to claim 1, wherein the olefin copolymer comprises a maleic anhydride-modified ethylene-octene copolymer.

9. The polyamide resin composition according to claim 1, wherein the polyamide resin composition has a plating adhesion strength of about 5 N/cm to about 25 N/cm, as measured on an injection-molded specimen having a size of 10 cm×10 cm×3.2 cm and plated with a 30 μm thick chromium layer at a peeling rate of 50 mm/min using a tensile tester in accordance with JIS C6481.

10. The polyamide resin composition according to claim 1, wherein the polyamide resin composition has a notched Izod impact strength of about 4 kgf·cm/cm to about 12 kgf·cm/cm, as measured on a ⅛" thick notched Izod specimen in accordance with ASTM D256.

11. The polyamide resin composition according to claim 1, wherein the polyamide resin composition has a flexural strength of about 800 kgf/cm² to about 1,500 kgf/cm² and a flexural modulus of about 40,000 kgf/cm² to about 70,000 kgf/cm², as measured on a specimen having a size of 127 mm×12.7 mm×6.4 mm at 2.8 mm/min in accordance with ASTM D790.

12. The polyamide resin composition according to claim 1, wherein the polyamide resin composition has a heat deflection temperature (HDT) of about 120° C. to about 160° C., as measured at a heating rate of 120° C./hr under a load of 18.56 kgf/cm² in accordance with ASTM D648.

13. A molded product comprising:
a base layer; and
a plating layer formed on at least one surface of the base layer,
wherein the base layer is formed of the polyamide resin composition according to claim 1.

14. The polyamide resin composition according to claim 1, wherein the polyamide resin composition has:
a plating adhesion strength of about 5 N/cm to about 25 N/cm, as measured on an injection-molded specimen having a size of 10 cm×10 cm×3.2 cm and plated with a 30 nm thick chromium layer at a peeling rate of 50 mm/min using a tensile tester in accordance with JIS C6481;
a notched Izod impact strength of about 4 kgf·cm/cm to about 12 kgf·cm/cm, as measured on a ⅛" thick notched Izod specimen in accordance with ASTM D256;
a flexural strength of about 800 kgf/cm² to about 1,500 kgf/cm² and a flexural modulus of about 40,000 kgf/cm² to about 70,000 kgf/cm², as measured on a specimen having a size of 127 mm×12.7 mm×6.4 mm at 2.8 mm/min in accordance with ASTM D790; and
a heat deflection temperature (HDT) of about 120° C. to about 160° C., as measured at a heating rate of 120° C./hr under a load of 18.56 kgf/cm² in accordance with ASTM D648.

* * * * *